O. H. COOKE.
SHOE LACER.
No. 75,126. Patented Mar. 3, 1868.
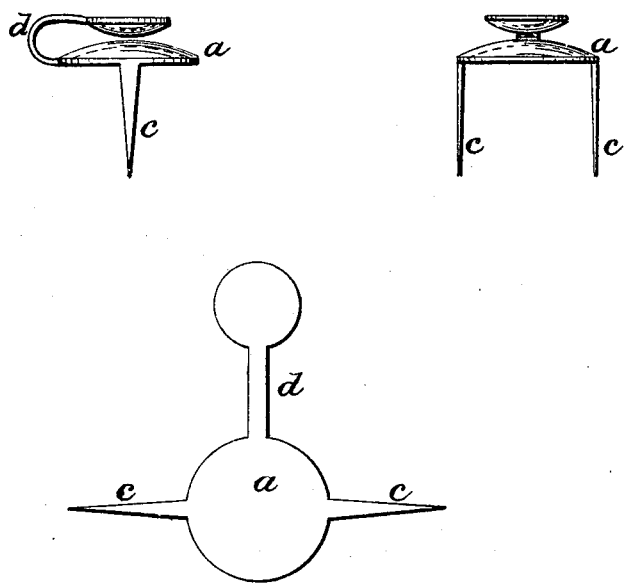
Witnesses:
U. D. Stockbridge
J. D. Willoughby
Inventor:
O. H. Cooke

United States Patent Office.

O. H. COOKE, OF MORRISTOWN, VERMONT.

*Letters Patent No. 75,126, dated March 3, 1868*

IMPROVED SHOE-LACER.

*The Schedule referred to in these Letters Patent and making part of the same.*

TO ALL WHOM IT MAY CONCERN:

Be it known that I, O. H. COOKE, of Morristown, in the county of Lamoille, and in the State of Vermont, have invented new and useful Improvements in Lacers; and do hereby declare that the following is a full, clear, and exact description thereof, reference being had to the accompanying drawings, and to the letters of reference marked thereon.

The annexed drawings, which make a part of this specification, represent three views of my shoe-lacer. In one of these views the form of the lacer is represented before it has been bent in proper shape for use, and just as it appears after having been struck out of sheet metal by a suitable die. The body $a$ of the lacer is made annular, and concave on its under side, and convex upon its upper. Two teeth, $c\ c$, and a shank, $d$, project from the body $a$. The teeth $c\ c$ are bent at right angles to the body $a$, so that they may be forced through the article to which the lacer is to be connected, and then bent either inwards or outwards with relation to each other, for the purpose of confining the lacer to the article. The outer end of the shank $d$ is made similar in shape to the body $a$, but smaller in diameter, and being concave upon its upper and convex upon its under side when in form for use. This shank is bent so as to form a hook, and its outer or annular end rests just over the upper side of body $a$. The convex sides of the two facing each other, a V-shaped groove is formed between their edges, into which the lacer-cord will readily take and spring the shank so that it will enter the hook. The under side of body $a$ being concave, it will readily be seen that when it is pressed tightly down upon the article to which it is to be attached, and its teeth are clinched, its edges will embed themselves in the material of the article, and tend to keep the lacer more securely in its place, and will prevent it from turning or moving so as to become loose. The formation of the head of the shank and the upper side of the body allows the two to be placed close together, so as to prevent the cord from slipping out, not only during the process of lacing, but at any time, should the cord become slack from any cause.

Having thus fully described my invention, what I claim as new, and desire to secure by Letters Patent, is—

The within-described lacer as an article of manufacture, consisting of a concavo-convex body, provided with the teeth $c\ c$ and a shank which is curved, and which has a convex head upon it, constructed and arranged as and for the purpose herein specified.

In testimony that I claim the foregoing, I have hereunto set my hand, this 18th day of February, 1868

O. H. COOKE.

Witnesses:
V. D. STOCKBRIDGE,
C. M. ALEXANDER.